United States Patent [19]

Neumann

[11] Patent Number: 5,222,306
[45] Date of Patent: Jun. 29, 1993

[54] APPARATUS FOR CENTERING AND THE AXIAL AND PARALLEL ALIGNMENT OF SHAFTS

[75] Inventor: Bob A. Neumann, Monroeville, Pa.

[73] Assignee: Westinghouse Electric Corp., Pittsburgh, Pa.

[21] Appl. No.: 937,628

[22] Filed: Aug. 28, 1992

[51] Int. Cl.⁵ .................... G01B 5/24; G01D 21/00
[52] U.S. Cl. ......................... 33/645; 33/529; 33/533; 33/412; 29/272
[58] Field of Search .............. 33/645, 520, 529, 533, 33/412, 613, 644; 29/272, 271

[56] References Cited

U.S. PATENT DOCUMENTS

| | | |
|---|---|---|
| 3,525,158 | 8/1970 | Torlay ................................ 33/412 |
| 3,979,814 | 9/1976 | Lajoie et al. ...................... 29/272 |
| 4,079,493 | 3/1978 | Oygarden et al. ................. 29/272 |
| 4,120,095 | 10/1978 | Lebourg .............................. 33/529 |
| 4,345,464 | 8/1982 | Herzl et al. ........................ 33/644 |
| 4,413,415 | 11/1983 | Stovall . | |
| 4,439,925 | 4/1984 | Lock . | |
| 4,502,233 | 3/1985 | Boltz et al. . | |
| 4,534,114 | 8/1985 | Woyton et al. .................... 33/645 |
| 4,586,264 | 5/1986 | Zatezalo ............................. 33/412 |
| 4,706,972 | 11/1987 | Kormos .............................. 33/520 |
| 4,964,224 | 10/1990 | Jackson .............................. 33/645 |

FOREIGN PATENT DOCUMENTS

| | | |
|---|---|---|
| 174288 | 3/1986 | European Pat. Off. ............ 33/645 |
| 566250 | 12/1932 | Fed. Rep. of Germany ....... 33/645 |

Primary Examiner—William A. Cuchlinski, Jr.
Assistant Examiner—C. W. Fulton

[57] ABSTRACT

Apparatus for centering and axial and parallel alignment a pair of rotatable shafts. An alignment collar assembly is adapted to fit over and around the periphery of a flanged end of a shaft or an adapter on the shaft. The alignment collar has mating halves for easy assembly and disassembly and has roller means adapted to engage both the periphery and the underside of the flanged end to permit a 360° rotation of the alignment collar assembly relative to the shaft. The alignment collar assembly is also adapted to support one or more gages for determining the axial and parallel position of the pair of rotatable shafts relative to each other.

9 Claims, 2 Drawing Sheets

5,222,306

APPARATUS FOR CENTERING AND THE AXIAL AND PARALLEL ALIGNMENT OF SHAFTS

BACKGROUND OF THE INVENTION

This invention relates to apparatus for centering and the axial and parallel alignment of a pair of rotatable shafts, such as the drive shafts used in a motor driven pump assembly. It is well known that the drive shafts of many types of power driven equipment must be very precisely aligned. Failure to accurately align the shafts will result in vibrations, excessive stresses in the shaft couplings, and premature wear on the shaft bearings.

Many pieces of power driven equipment need to be regularly disassembled in the field for the replacement of seals, lubrication or other maintenance purposes. In many cases, the accurate centering and axial and parallel alignment of the drive shafts during reassembly has been a difficult and time consuming operation, frequently using a trial and error practice.

Previously known apparatus for aligning rotatable shafts has generally been expensive, and designed for use only in machine shop situations. Such apparatus is frequently too large and cumbersome to use in the field.

Such previously known apparatus has also lacked versatility and was limited to one specific type of power driven equipment. The known apparatus was also limited in the number and accuracy of the alignment measurements that could be taken.

SUMMARY OF THE INVENTION

It is an object of this invention to provide apparatus for axial and parallel alignment of a pair of rotatable shafts, especially vertical shafts, that is simple and reliable in its construction and operation.

It is a further object of this invention to provide alignment apparatus that is easily usable in the field where working conditions and accessibility may be difficult.

It is a still further object of this invention to provide alignment apparatus that is versatile and suitable for making a variety of alignment measurements.

These and other objects of this invention can be attained by apparatus for the axial and parallel alignment of a pair of rotatable shafts in which at least one of the shafts has a circular flange end. The apparatus comprises an alignment collar assembly adapted to fit over and around the periphery of a circular flanged end of a shaft. The alignment collar assembly comprises a pair of mating halves to fit easily around the shaft end and which are secured to each other by latches. The alignment collar assembly also has a system of roller bearings adapted to engage the shoulder, the periphery and the underside of the flanged end of the shaft so that the collar assembly can be rotated easily around the flanged end. The alignment collar is used to support one or more gages, such as dial indicator gages, for determining the center position and the axial and parallel positions of the pair of rotatable shafts relative to each other.

BRIEF DESCRIPTION OF THE DRAWINGS

In the accompanying drawings, I have illustrated several preferred embodiments of my invention.

DETAILED DESCRIPTION OF THE PREFERRED EMBODIMENTS

Figure 1:
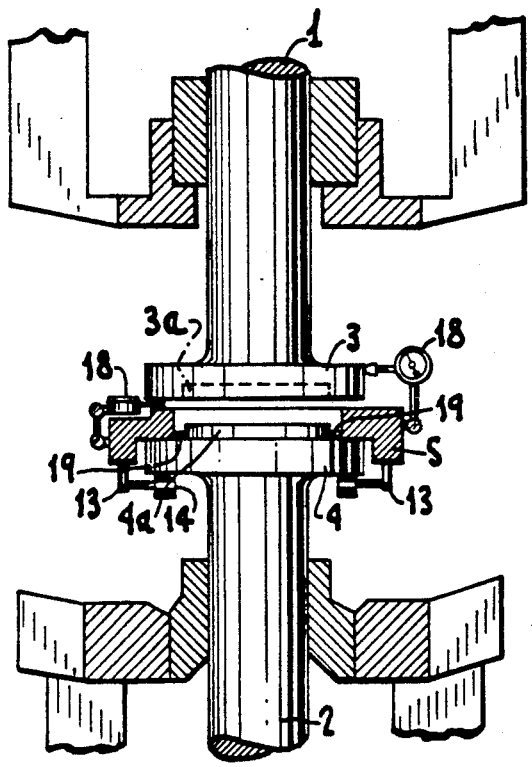
FIG. 1 is a partial sectional view showing the apparatus of this invention being used for the centering and the axial and parallel alignment of two flanged end vertical shafts of a motor and a pump.

Referring to FIG. 1, I have illustrated one embodiment of the apparatus of this invention being used to axially align a vertical rotatable shaft 1 of a motor with a vertical rotatable shaft 2 of a pump that have been disconnected from each other for maintenance purposes. In this embodiment, both shafts 1 and 2 have opposed circular flanged ends 3 and 4 provided with a female recess 3(a) and a mating male shoulder 4(a). The flanged ends 3 and 4 are tightly bolted together when the motor and pump are in service.

The alignment collar assembly 5 of this invention is shown positioned on the circular flanged end 4 around the male shoulder 4a of the pump shaft 2. The collar assembly 5 is sized to fit over and around the periphery of the circular flanged end 4 and male shoulder 4(a) as illustrated in FIG. 1.

Figure 3:
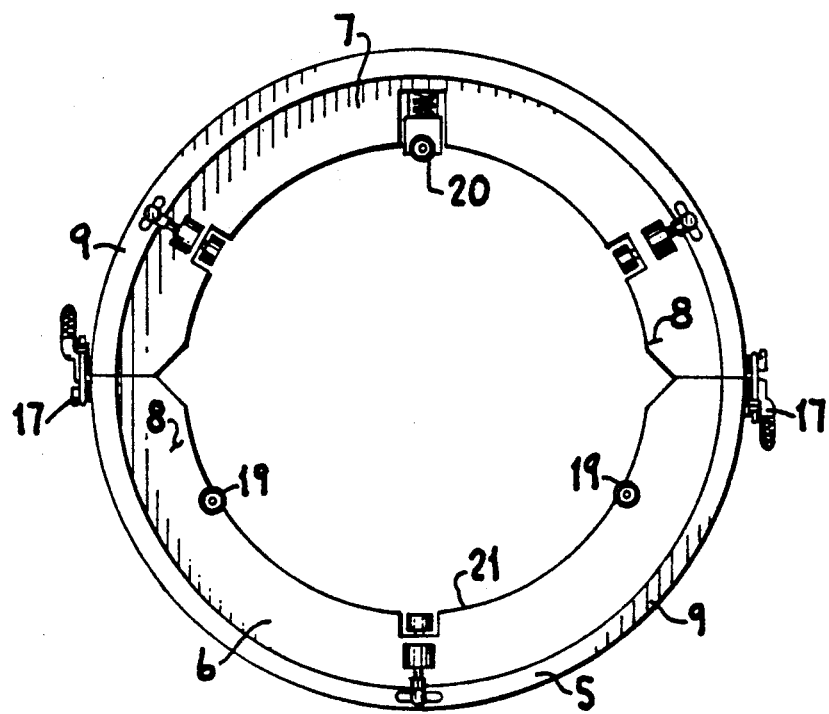
FIG. 3 is a bottom view of the alignment collar assembly of this invention.
Figure 4:
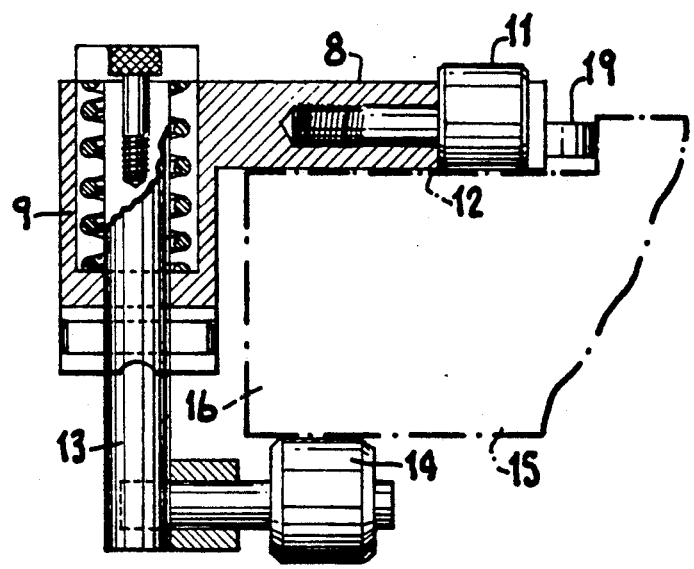
FIG. 4 is a partial sectional view of the alignment collar assembly of this invention.

The alignment collar assembly 5 of this invention is further illustrated in FIGS. 3 and 4. The collar assembly 5 comprises a pair of mating halves 6 and 7, each of which has a face portion 8 and a depending shoulder portion 9 and is machined from steel or aluminum. As best illustrated in FIG. 4, the face portion 8 of the collar assembly 5 is provided with a plurality of track rollers 11 which are free to roll on the flat top surface 12 of the circular flanged end 4 next to the male shoulder 4a. The face portion 8 is also provided with a plurality of radial roller bearings 19 and 20 spaced equally around the inner edge 21 of the face portions 8 of collar assembly 5. One of the radial roller bearings 20 is spring loaded so that the radial roller bearings 19 and 20 engage the male shoulder 4(a) but are free to rotate about the male shoulder 4(a) and thereby accurately center the collar assembly 5 on the flanged end 4 of the shaft 2. FIG. 4 also shows that the depending shoulder portion 9 of the collar assembly 5 is provided with a plurality of spring loaded arms 13 and stabilizer rollers 14 which are adapted to engage the underside surface of circular flanged end 4. Spring loaded arms 13 permit the rollers 14 to securely clamp the whole alignment collar assembly 5 to the circular flanged end 4 while the rollers 11, 14, 19 and 20 permit the collar assembly 5 to be rotated a full 360° around the peripheral surface 16 of the circular flange end 4.

As shown in FIG. 3, a pair of draw pull latches 17 or similar devices are used to hold the two halves 6 and 7 of the collar assembly 5 together and in close contact with the circular flanged end 4 during the shaft alignment operation but permit easy removal of the collar assembly 5 when the alignment has been completed.

As shown in FIG. 1, one or more gages 18, such as dial indicator gages, are attached to the alignment collar assembly 5 at appropriate locations and are used to measure the parallel and axial position of the shafts 1 and 2 relative to each other through a full 360° rotation of the alignment collar assembly 5 as shown in FIG. 1. Such measurements permit the adjustment of the shafts 1 and 2 as may be required to bring them into alignment without the necessity of actually rotating the shafts 1 and 2 themselves.

Figure 2:
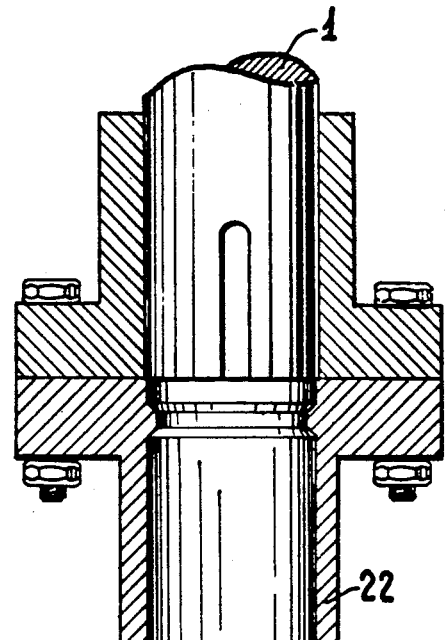
FIG. 2 is a partial sectional view showing the apparatus of this invention for the axial and parallel alignment of a smooth end vertical shaft of a pump with a motor coupling.
Figure 2:
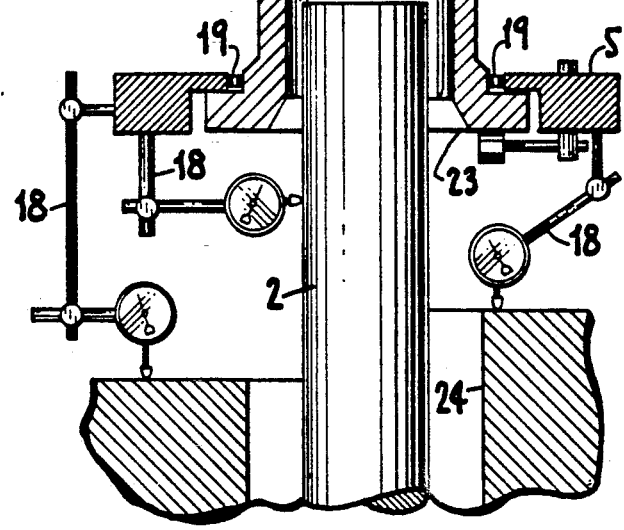

FIG. 2 illustrates another embodiment of this invention in which the opposed ends of the motor shaft 1 and the pump shaft 2 are separated from each other by a considerable distance during their disassembly. In this embodiment, an adapter sleeve member 22 is bolted or otherwise tightly secured to the motor shaft 1 or the motor mount. The adapter sleeve member 22 is provided with a lower circular flange designed to receive and accommodate the alignment collar assembly 5 of this invention as shown in FIG. 2. Gages 18 are positioned on the collar assembly 5 to measure the position of pump shaft 2 relative to the motor shaft 1 and to the pump housing. 24. This embodiment also illustrates how the alignment collar assembly 5 of this invention may be used to align shafts that do not have circular flanged ends.

These embodiments illustrate the versatility of the apparatus of this invention and its suitability for various types of shaft connections. While I have describe its use in the alignment of vertical shafts in a motor driven pump, this invention is not limited to any particular type of powered equipment and is usable in all situation where a precise, accurate centering and parallel and axial alignment of a pair of shafts is required.

I claim:

1. Apparatus for axially aligning a pair of rotatable shafts, at least one of said shafts having a circular flanged end, an alignment collar assembly adapted to fit over and around the periphery of said circular flanged end, said alignment collar comprising a pair of mating halves and having roller means adapted to engage both the top surface and underside of said circular flanged end, said alignment collar adapted to support one or more gages for determining the position of said pair of rotatable shafts relative to each other.

2. The apparatus of claim 1 in which the roller means of said alignment collar assembly which engages the underside of said circular flanged end is spring loaded.

3. The apparatus of claim 1 in which the pair of mating halves of said alignment collar are connected by a pair of latches.

4. The apparatus of claims 3 in which the latches are draw pull latches.

5. The apparatus of claim 1 in which one or more of the gages are dial indicator gages.

6. The apparatus of claim 1 in which said pair of rotatable shafts are in a substantially vertical position.

7. The apparatus of claim 1 in which the roller means adapted to engage the top surface of said circular flange comprise at least three equally spaced rollers.

8. The apparatus of claim 1 in which said alignment collar fits over and around the periphery of a flanged end of a sleeve member secured around one of the rotatable shafts whereby said alignment collar can be positioned around and axially along the other rotatable shaft.

9. The apparatus of claim 1 in which additional roller means engage a shoulder on the circular flanged end.

* * * * *